Sept. 3, 1946.                D. G. HUNTER                2,406,772
                         FOLDING PHOTOGRAPHIC CAMERA
                            Filed Jan. 11, 1944
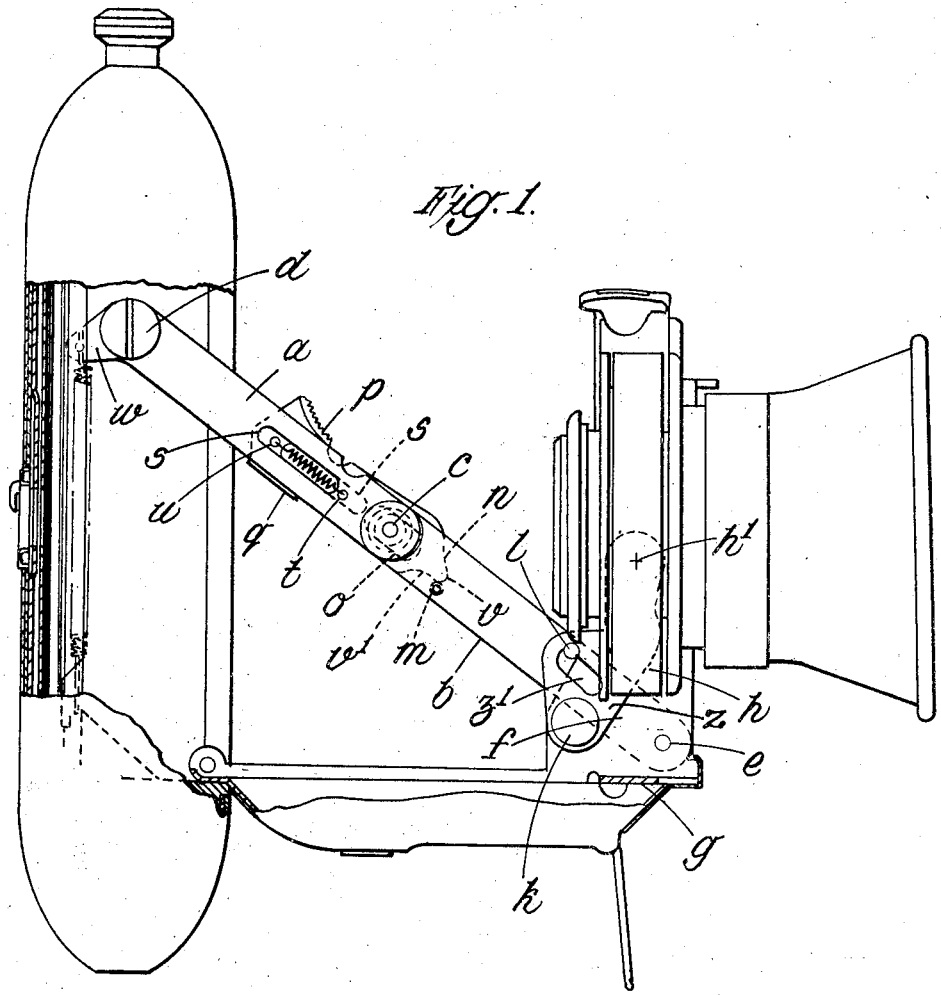
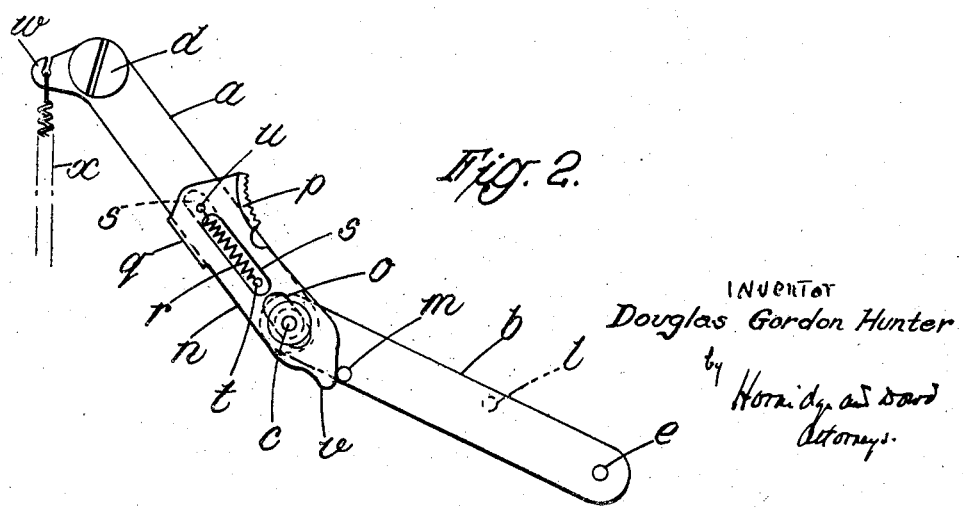
INVENTOR
Douglas Gordon Hunter Patented Sept. 3, 1946

2,406,772

UNITED STATES PATENT OFFICE 2,406,772

FOLDING PHOTOGRAPHIC CAMERA

Douglas Gordon Hunter, London, England, assignor to Barnet Ensign Limited

Application January 11, 1944, Serial No. 517,771
In Great Britain January 25, 1943

3 Claims. (Cl. 95—40)

This invention relates to the front-erecting arrangements of folding photographic cameras and, more definitely speaking, to self-locking struts which may be used in conjunction with the fronts of self-erecting cameras.

A commonly employed arrangement of struts for self-erecting cameras comprises a pair of spring-loaded articulated links on each side of the camera, the outer end of the upper link being simply pivoted to the upper part of the camera body and the outer end of the lower link to a bracket on the front of the baseboard and the lower link having a transverse locating pin which engages loosely in an L-shaped slot in a small strut pivoted to the baseboard and cooperates with a rearwardly-directed locating surface on the lens panel when the camera front is erected. In closing the camera, the usual procedure is to grasp the camera in both hands and to use the thumbs to depress the articulated joints of the links against the spring loading when the camera can be folded into the closed position. In such forms of construction, the locking is not very positive and its efficacy depends to some extent upon the strength of the springs employed.

The present invention aims at providing a rigid construction for the fronts of folding cameras which also provides a truly positive lock.

The novel strut according to the invention, comprises a pair of links hinged together, with a catch mounted on one of the links and drawn resiliently towards the other link and having a cam profiled portion which engages a projection on the said other link so as to cause the catch to be thrust back by the interaction of its profiled portion with the said projection when the two links are turned relatively in one direction to straighten them whereupon the projection engages the catch to prevent the links being turned back until the catch is manually retracted. Conveniently, the catch may be guided to move rectilinearly relatively to the link on which it is mounted. In a camera fitted with two such struts in the form of two parts or links hinged together and each at its outer end hinged to the camera body and front baseboard respectively after the fashion of toggle links, one link has a sliding catch biased by a spring so that when the links are straightened, the catch snaps behind a projection from the other link and positively prevents the folding together of the links until the sliding catch has been retracted against the action of its spring.

In order to explain the invention more fully, an example of a strut and a camera fitted with same will now be fully described with reference to the accompanying drawing, in which:

Figure 1 is a side elevation of a camera fitted with the novel arrangement with the front in the erect position; and Figure 2 is a similar view of the strut hidden at the back in Figure 1, in the position assumed during the opening of the camera as the strut is approaching the straightened condition.

In the form of construction illustrated, a strut on each side of the camera comprises a pair of links $a$, $b$ in the form of flat strips of steel hinged together by a pivot pin $c$. The upper link $a$ is pivoted to the inside of the camera body at $d$ and the lower link $b$ is pivoted at $e$ to a bracket $f$ upstanding from the front baseboard $g$ of the camera. The lens panel $h$ is pivoted at $h_1$ to a pair of slotted links $z$ which are pivoted at $k$ to the brackets $f$. The lens panel $h$ is held erect by a pin $l$ extending outwards from each of the lower links $b$ and engaging in the slot $z_1$ of the respective link $z$, but this does not form part of the present invention.

The lower link $b$ also carries a pin $m$ projecting inwardly from its lower edge, just below the hinge pin $c$. The upper link $a$ has a sliding catch $n$ slotted at $o$ to engage the hinge pin $c$ and is turned over at $p$ and $q$ to guide it along the link $a$. A coiled tension spring $r$ is housed in slots $s$ in the catch $n$ and upper link $a$ and is anchored to the latter at $t$ and to the catch $n$ at $u$ so that normally it draws the catch $n$ downwards as far as permitted by the slot $o$ and hinge pin $c$ when the pin $m$ lies in the path of the nose $v$ of the catch $n$. The nose $v$ is shaped so that when the camera is being opened, as shown in Fig. 2, a camming action takes place between the pin $m$ and the upper edge of the nose $v$ which forces the catch $n$ upwards until just as the links $a$, $b$ are coming into line, the nose $v$ snaps past the pin $m$ and the catch is drawn down by the spring $r$ into the position shown in Figure 1. The under edge surface $v_1$ of the nose $v$ of the sliding catch $n$ is inclined at a small angle to the line of movement of the catch $n$. The reason for this is to allow of positive locking of the strut $a$, $b$ irrespective of small differences due to manufacturing tolerances and wear since, if the under surface $v_1$ were parallel to the line of sliding movement, the positive locking would only take place in one position. When the strut $a$, $b$ is thus locked, it cannot be folded back to enable the camera to be closed until the catches $n$ are drawn upwardly along the links $a$ by hand so that the noses $v$ clear the pins $m$. In order that the catches n may be thus retracted, the turned-over parts p are curved to fit the operator's thumbs and their upper edges are knurled as seen in the drawing.

Thus the camera in the condition shown in Figure 1 may be grasped in both hands and the two thumbs applied to the knurled upper edges of the parts p of the catches n so as to draw the latter up until their noses v are clear of the pins m whereupon the hinge pins c may be pushed downwards and the camera folded into the closed position.

In order that the camera may be self-erecting, each of the upper links a is provided at its upper end with an offset lug or bell-crank w to which is secured one end of a coiled tension spring x, the lower end of which is anchored to the inside of the side wall of the camera body at y. Thus, when the front of the camera is unlatched, the springs x turn the links a, thus raising the hinge pins c so that the struts pass through the position shown in Figure 2, into the position indicated in Figure 1 so that the camera is automatically opened and the front erected and locked.

What I claim is:

1. A folding photographic camera, comprising a camera body, a front baseboard hinged thereto and a pair of folding struts each comprising a pair of links pivotally connected together and pivoted at their outer ends respectively to said camera body and to said front baseboard, one of said links being formed with a lateral projection in the vicinity of the pivoted joint, and a catch resiliently mounted on the other of said links and movable lengthwise thereof, said catch being formed with a nose having on one side a cam profile substantially inclined to the line of movement of said catch so as to engage and resiliently to yield under the pressure of said projection when said links are relatively turned in the direction so as to straighten the same until said links are in straightened position when the nose of said catch passes over said projection and having on the opposite side a profile with an inclination to the line of movement of said catch substantially less than said inclination thereto of said cam profile so as to positively lock the said catch and projection when the nose of said catch is over said projection, and said catch being shaped to form a thumb piece enabling the catch to be drawn away from said projection on the other link.

2. A folding photographic camera, comprising a camera body, a front baseboard hinged thereto and a pair of folding struts each comprising a pair of links pivotally connected together and pivoted at their outer ends respectively to said camera body and to said front baseboard, one of said links being formed with a lateral projection, a catch slidably mounted on the other of said links and a spring connected to urge said catch towards said projection, said catch being formed with a nose having on one side a cam profile substantially inclined to the line of movement of said catch so as to engage and resiliently to yield under the pressure of said projection when said links are relatively turned in the direction so as to straighten the same until said links are in straightened position when the nose of said catch passes over said projection and having on the opposite side a profile with an inclination to the line of movement of said catch substantially less than said inclination thereto of said cam profile so as to positively lock the said catch and projection when the nose of said catch is over said projection, and said catch being shaped to form a thumb piece enabling the catch to be drawn away from said projection on the other link.

3. A folding photographic camera comprising a camera body, a front baseboard hinged thereto and a pair of folding struts each comprising a pair of links pivotally connected together and pivoted at their outer ends respectively to said camera body and to said front baseboard, one of said links being formed with a lateral projection and the other of said links having parallel edges, a catch mounted in contact with said second-mentioned link and having edge portions turned over in contact with the edges of said second-mentioned link and being formed with a slot into which the pivot between said links projects to guide said catch resiliently on said second-mentioned link and a spring connected to urge said catch towards said projection, said catch being formed with a nose having on one side a cam profile substantially inclined to the line of movement of said catch so as to engage and resiliently to yield under the pressure of said projection when said links are relatively turned in the direction so as to straighten the same until said links are in straightened position when the nose of said catch passes over said projection and having on the opposite side a profile with an inclination to the line of movement of said catch substantially less than said inclination thereto of said cam profile so as to positively lock the said catch and projection when the nose of said catch is over said projection, and said catch being shaped to form a thumb piece enabling the catch to be drawn away from said projection on the other link.

DOUGLAS GORDON HUNTER.